United States Patent [19]

Palmaer et al.

[11] Patent Number: 4,901,844
[45] Date of Patent: Feb. 20, 1990

[54] LOW TENSION PLASTIC CONVEYOR BELT SYSTEM

[75] Inventors: Eric K. Palmaer, Rancho Cordova; Karl V. Palmaer, Folsom, both of Calif.

[73] Assignee: KVP Systems, Inc., Rancho Cordova, Calif.

[21] Appl. No.: 251,743

[22] Filed: Oct. 3, 1988

[51] Int. Cl.$^4$ ............................................. B65G 13/02
[52] U.S. Cl. ................................. 198/778; 198/852
[58] Field of Search ............... 198/778, 851, 852, 853, 198/831, 835; 62/381; 99/443 C

[56] References Cited

U.S. PATENT DOCUMENTS

| | | | |
|---|---|---|---|
| 2,681,728 | 6/1954 | Boron | 198/851 |
| 3,826,352 | 7/1974 | Van Zon et al. | 198/778 |
| 3,980,425 | 9/1976 | Pinettes et al. | 198/851 X |
| 4,023,381 | 5/1977 | Onodera | 198/778 X |
| 4,050,323 | 9/1977 | I'Anson | 198/853 |
| 4,153,152 | 5/1979 | Lapeyre | 198/852 X |
| 4,220,052 | 9/1980 | Sheldon | 198/853 X |
| 4,438,838 | 3/1984 | Hodlewsky et al. | 198/853 |
| 4,741,430 | 5/1988 | Roinestad | 198/778 |
| 4,742,907 | 5/1988 | Palmaer | 198/852 X |
| 4,798,062 | 1/1989 | Lipinski et al. | 198/778 X |

FOREIGN PATENT DOCUMENTS

| | | | |
|---|---|---|---|
| 1201407 | 3/1984 | Canada | 198/851 |
| 0095933 | 12/1983 | European Pat. Off. | 198/851 |
| 2564810 | 11/1985 | France | 198/852 |

*Primary Examiner*—Robert J. Spar
*Assistant Examiner*—Cheryl L. Gastineau
*Attorney, Agent, or Firm*—Thomas M. Freiburger

[57] ABSTRACT

An all-plastic conveyor belt of the type that is collapsible on curves is used in a low tension system, progressing in a helical path around a drive cage or tower. The modules making up the belt have end members with recesses for receiving the heads of plastic rods which hold the modules together. The heads are thus recessed and will not wear against bars or other components of the drive cage or tower of the low tension system. The end members of the belt modules in one embodiment are slightly concave for better conforming to the surfaces of the driving tower or cage.

5 Claims, 4 Drawing Sheets

LOW TENSION PLASTIC CONVEYOR BELT SYSTEM

BACKGROUND OF THE INVENTION

The invention relates to conveyor belt systems, and more particularly to a low tension system wherein a plastic conveyor belt is used, in such a way as to eliminate most wear problems.

Plastic conveyor belts have been in increasing use, particularly in the food industry where dwell time in an oven, a freezer or other food treating environment is needed, for a maximum amount of product and with minimum space requirement. These belts are also used in the electronics and computer industries. See, for example, U.S. Pat. No. 4,742,907 directed to a plastic conveyor belt formed of a series of modules, assigned to the same assignee as the present invention. Such a plastic conveyor belt is designed to travel in straight paths and around curves, and may make both left and right curves. The belt collapses on the inside of curves, having rods connecting adjacent belt segments through slotted holes.

Some plastic conveyor belts have had end members or end plates which are thickened and have recesses at their outer surfaces, for recessing the head of a rod so that the rod head does not protrude out from the end member or end plate. This prevents snagging of the heads on components of the belt driving or guidance system.

In low tension spiral conveyor belt systems (such as Ashworth Low Tension Spiral System) a belt, generally of metal, travels in a helical path around a rotating driving tower or cage or drum. The belt passes over a driven sprocket at a take-up drive location separate from the driving tower. In passing around and in contact with the driving tower, the belt is friction driven, assisted in its movement generally throughout the length of the belt's path on the tower, greatly reducing tension in the belt as compared to tension which would occur if the belt were only driven from one point. The belt is actually driven at a great number of points of contact with the cage or drum.

In such low tension systems, the edges of the belts have been engaged generally by bars or vertical members or rods of the driving cage or tower. The edges of the belts have generally been irregular, with end structure of the component belt modules exposed and irregular and not smooth. This is often due to exposed and protruding heads of transverse module connecting rods, and results in snagging of the rod heads against the driving cage and in excessive wear of the rod heads or other protruding components or surfaces of the belt as well as of the cage members. The problem is particularly accentuated by the fact that the tower or cage must be driven at a speed somewhat faster than that of the belt in an overdrive condition, inasmuch as the belt is moving both horizontally and vertically along the cage. A slipping condition therefore exists between the edge surfaces of the belt and the external surfaces of the driving tower or cage. This condition must exist whether the belt starts from the bottom and ends up at the top or starts from the top and ends up at the bottom in relation to the moving cage. (The cage is actually driving the belt supported by spiral support strips around the drum or the cage, up or down, as shown in the drawings and discussed further below.)

Previous to the present invention, there has been no suggestion for solving this problem by eliminating snagging, tearing and catching and thereby improving the performance, wearability and life of a low tension conveyor belt system utilizing a plastic conveyor belt, as in the present invention described below.

SUMMARY OF THE INVENTION

In accordance with the present invention, a low tension spiral conveyor belt system includes an endless conveyor belt of all plastic or substantially all plastic components. The belt is made up of a series of elongated plastic modules with interdigited projections held together by plastic rods passing transversely through bores in the overlapping projections. At the ends of the plastic rods are heads or other end members holding the rods in the plastic modules, and these heads are recessed into end members of the plastic modules, each of which has, at least on one side of the belt, a recessed or enlarged outer bore portion in the end member, for receiving the rod head.

In this way, the plastic conveyor belt of the low tension system of the invention presents relatively smooth surfaces to the driving cage or drum which engages the edge of the belt at the inside of its curvature. The belt is more efficiently driven by the drum, wear to the edges of the belt and to the driving drum or cage is minimized, and the overdriving or higher speed of rotation of the drum in order to move the belt both horizontally and vertically is more readily accomplished.

The plastic conveyor belt system of the invention efficiently travels around the curves in a way not possible with previously available belts. It is therefore efficiently used in the described low tension system, spiraling around the driving cage.

In a specific embodiment, the end plates or members at the ends of the belt modules, which form the exposed surfaces of the inside edge of the belt, are slightly curved to match the curvature of the driving drum. This further reduces wear and adds to the frictional engagement of the driving drum against the belt edges, tending to further reduce tension in the conveyor belt by evenly applying driving power to the belt as it rides on wear strip surfaces in its helical path around the drum.

In another specific embodiment, the belt segments or modules include side plates at the inside of the curve which may be of a different material than the rest of the belt. In this way a plastic material of higher friction coefficient can be used for the side plates, where friction with the driving tower should be relatively high. This is different from the belt's horizontal surface engagement with the helical wear strip on which it rides, where friction must be minimized. Friction with the driving tower, however, should not be so high that the lifting of the belt along the tower, which requires vertical sliding along the tower's bars, is interfered with significantly.

Another embodiment of the invention, which can be combined with either or both of the above embodiments, includes raised outer plates on one or preferably both sides of the belt. The raised plates keep products from falling off the belt or running into the cage.

It is therefore among the objects of the present invention to improve over prior low tension spiral conveyor belt systems with driving towers or drums, by incorporating in such a system a substantially all plastic conveyor which is free of rod heads or other protrusions on the belt's edge at the inside of the curve where the belt progresses helically around the drum. These and other objects, advantages and features of the invention will be apparent from the following description of a preferred embodiment, considered along with the accompanying drawings.

DESCRIPTION OF PREFERRED EMBODIMENTS

Figure 1:
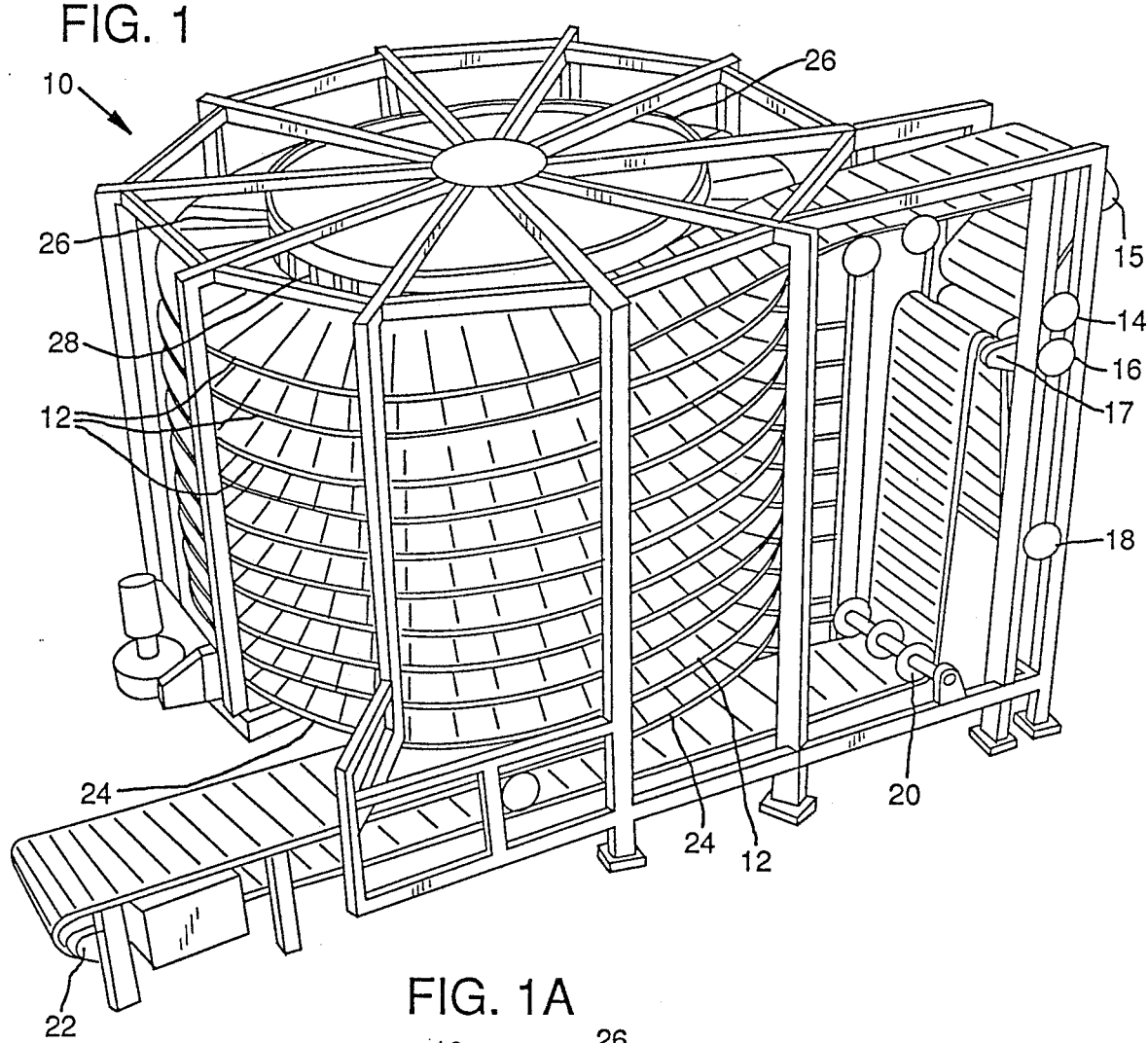
FIG. 1 is a perspective view generally illustrating a low tension spiral conveyor belt system in accordance with the invention.
Figure 1A:
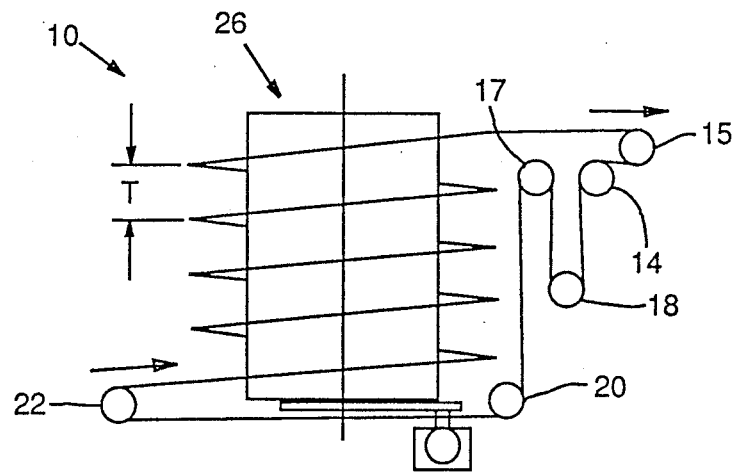
FIG. 1A is a schematic elevational view of the system shown in FIG. 1.

In the drawings, FIGS. 1 and 1A show a low tension conveyor belt system 10 in accordance with the principles of the invention. The system 10 includes a plastic conveyor belt 12, preferably with all plastic or substantially all plastic components, a take-up belt drive or sprocket drive which may be at a sprocket 14 driven by a motor (not specifically shown), additional feed sprockets 15, 16 and 17, a take-up sprocket 18, and additional sprockets 20 and 22, all defining a path through which the conveyor belt 12 is fed. The system includes a helical wearstrip belt support or ramp 24 and a driving tower or cage or drum 26 about which the wearstrip ramp is positioned and against which the belt 12 engages at its inside edge as it travels helically around the drum 26.

As is known in the prior art, the driving cage 26 is intended to drive the conveyor belt (which has generally been a steel conveyor in the prior art) by engaging against the inner edge of the belt with vertical bars or spindles 28 or other exterior drum structure, thereby providing driving force to the belt at many points (or substantially continuously) along its movement and accordingly greatly reducing tension in the belt as compared to a belt driven from a single location.

The driving cage, as in prior systems, is rotated at a speed slightly higher than that of the moving belt 12, providing a positive driving assistance to the belt, and a constant slipping of the driving cage over the edge surfaces of the belt occurs. This is an "overdrive" condition. There must be sufficient overdrive to lift the belt and load along the inclined ramp 24 while also moving it generally horizontally. The take-up drive 14 acts as an assist and tension drive, and moves the belt only horizontally in relation to the cage.

However, in prior systems having a driving cage or drum for belt driving and lowering of tension, there has been present a series of protrusions at the edge surfaces of the belt engaging the driving drum. Primarily these have comprised heads or ends on connecting rods which secure successive belt modules together. Although such systems have functioned satisfactorily, they have produced excessive wear on the protrusions, such as the rod head, and distortion of the belt as well as the surface of the driving drum itself (occasionally the vertical bars of the driving cage have been of plastic to reduce this wear problem). The protrusions have also interfered with the smooth engagement of the belt by the driving drum, reducing the effective frictional engagement between the belt edges and the surfaces of the driving drum. This has resulted in reduced efficiency of the low tension system and in relatively severe variations in the degree of tension of the belt and surges of the belt as it passed around the drum.

Figure 2:
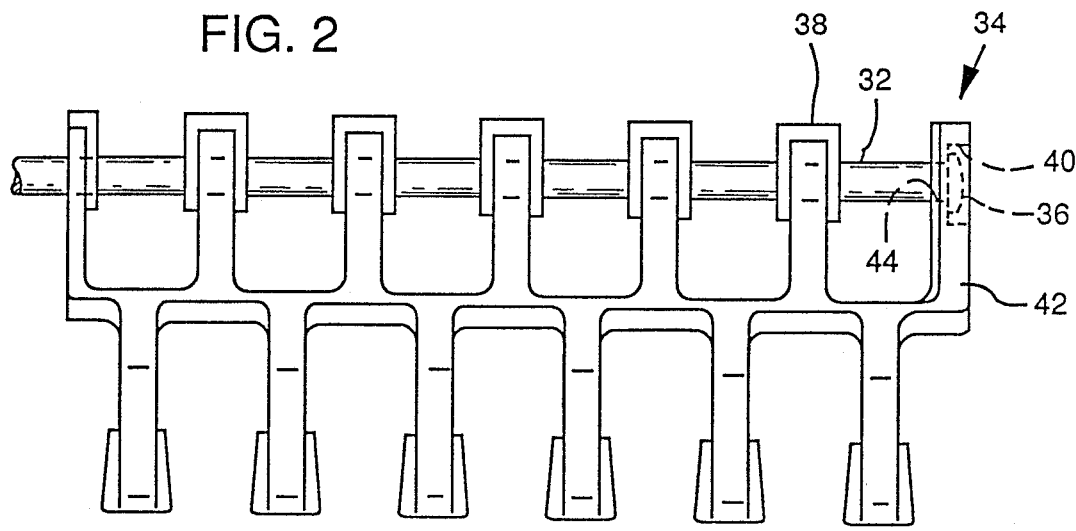
FIG. 2 is a plan view showing details of construction of a plastic conveyor belt incorporated in the system illustrated in FIG. 1.
Figure 3:
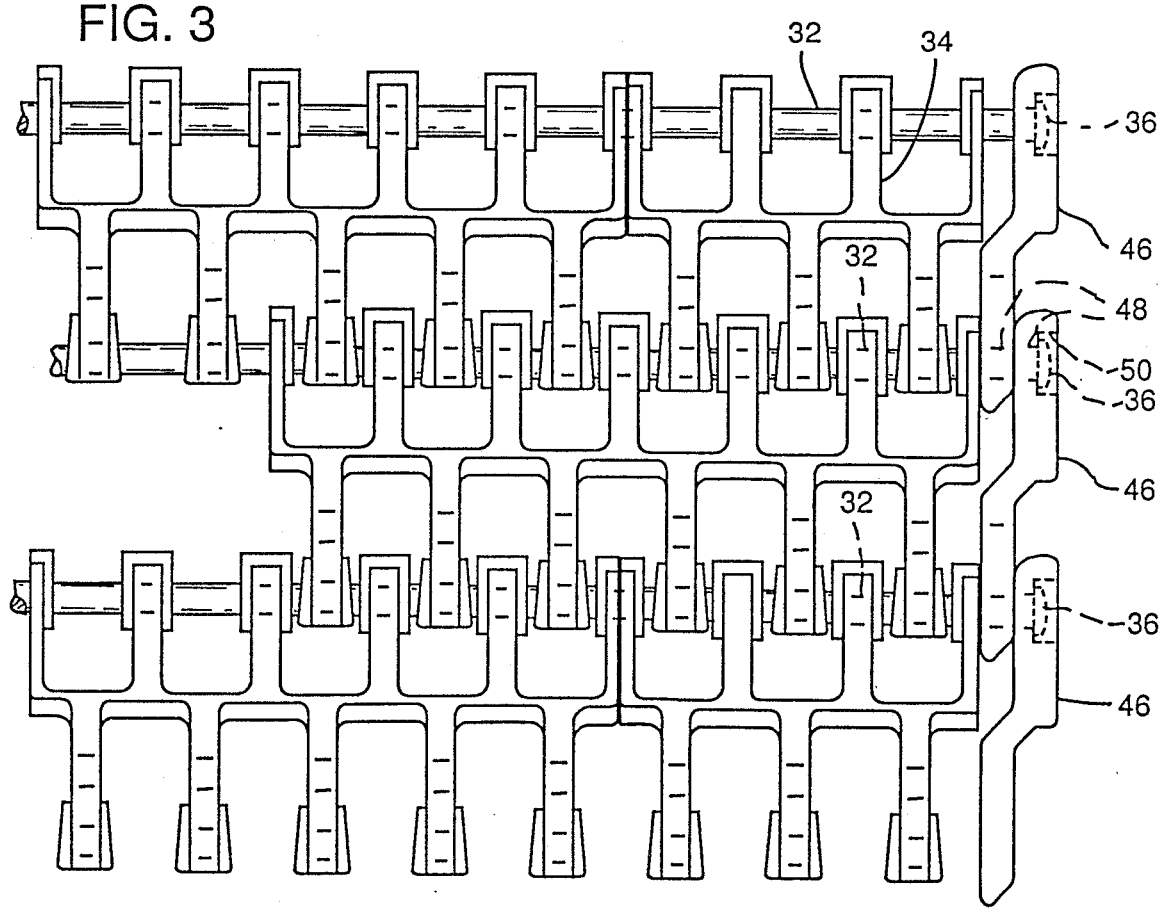
FIG. 3 is a plan view showing another embodiment wherein each belt module has attached to it a separate, nonintegral end plate.
Figure 4:
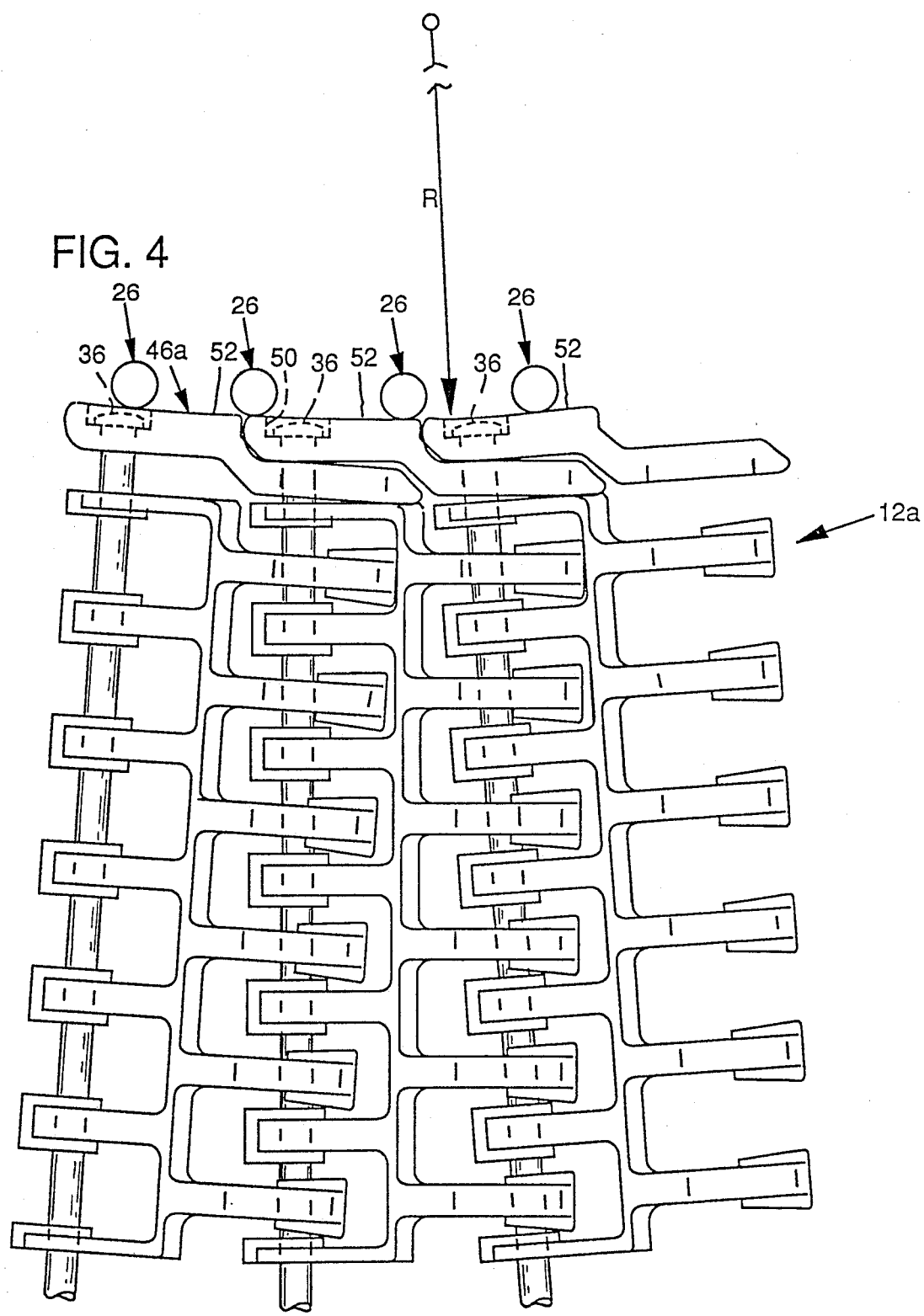
FIG. 4 is a partial plan view showing the belt curving around a driving tower or drum of the low tension system, illustrating the contact between the driving tower and the edges of the conveyor belt, and including a variation of the construction shown in FIG. 3.

In the system of the present invention, these problems are eliminated by the use of the plastic conveyor belt 12 in the structure as illustrated particularly in FIGS. 2, 3 and 4. As shown, plastic connecting rods 32 which serve to connect adjacent belt modules 34 have heads 36 on each end which are protected from interference or engagement with driving surfaces of the driving drum 26. The rods 32 connect interdigited projections 38 of each belt module as depicted in the drawing. Their heads 36 lie in recesses 40 formed in end members 42 of the belt modules. The recesses 40 comprise enlarged bores on the axis of smaller bores 44 which extend through the end members and all projections of the interdigited structure.

As illustrated in FIG. 2, the rod heads 36 do not protrude beyond the outer surface of the end members 42 of the belt modules. As discussed above, this avoids excessive wear of the belt module, of the rod and of the driving cage as the belt is "overdriven" by the cage.

FIG. 3 shows a portion of the belt 12, i.e. several modules 34 connected by rods 32 which are also preferably of plastic. In this embodiment, the end members of the modules 34 comprise separate plates 46, non-integral with the body of the module 34. The cage-engaging plates 46 have bores 48 and recesses 50, as in the end members 42 discussed above and shown in FIG. 2. The use of separate plates enables the cage-engaging members to be of a higher-friction material than the body of the module 34. This is important in controlling the friction between the driving drum or cage and the belt in relation to the force required to lift the belt, and it enables minimizing friction (with a different plastic material) between the belt's lower surface and the wearstrip 24 on which it slides.

FIG. 4 shows a portion of a belt 12a which is traveling in an arcuate path around the driving cage 26. In the belt 12a, end plates 46a are slightly modified, arcuately (concavely) shaped for a more complementary engagement against the driving drum. An outer cage-engaging surface 52 of each end plate 46a is concave, with a radius generally matched to that of the driving drum or cage 26. This can help promote still smoother frictional driving of the belt by the drum.

Figure 5:
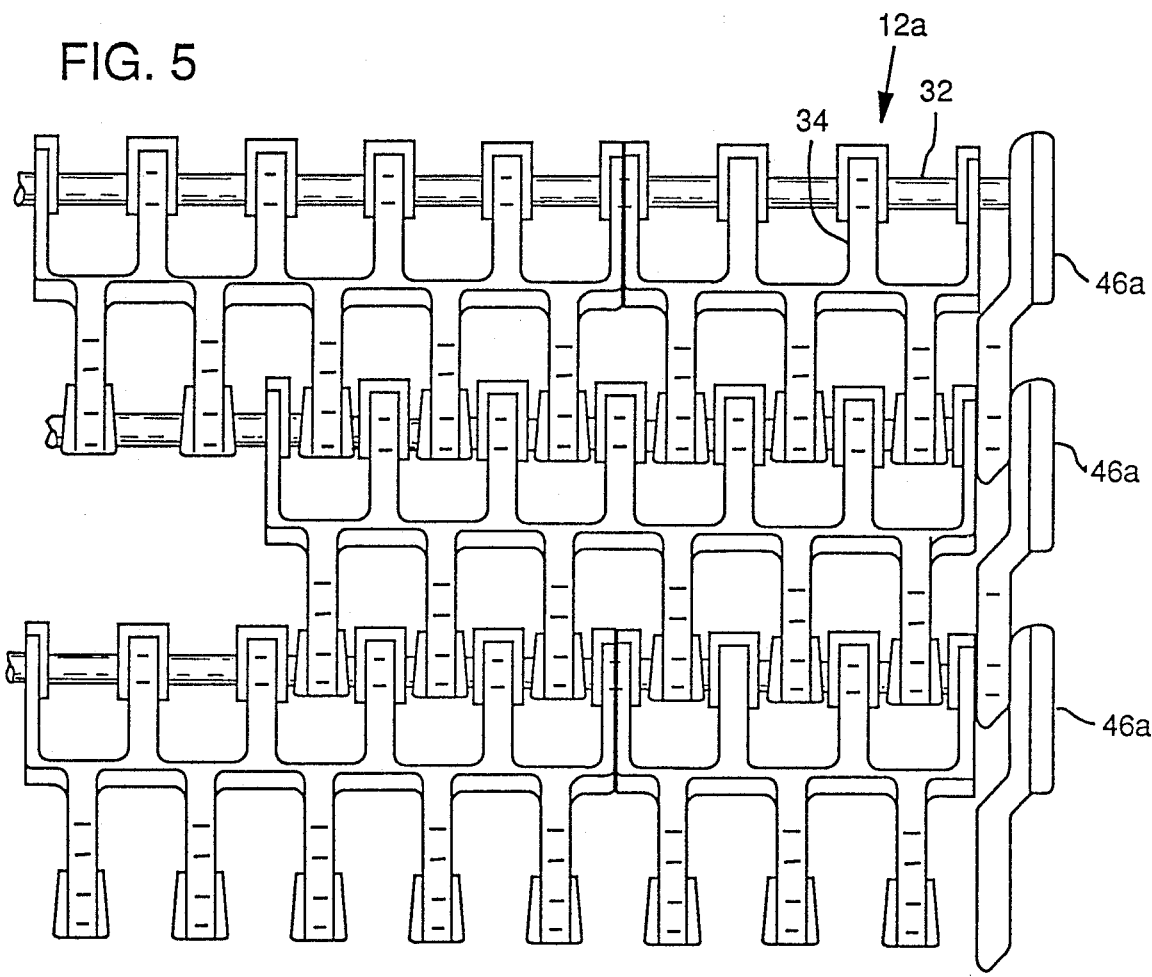
FIGS. 5 and 6 are plan and side elevation views showing another modification of the plastic conveyor belt.
Figure 6:
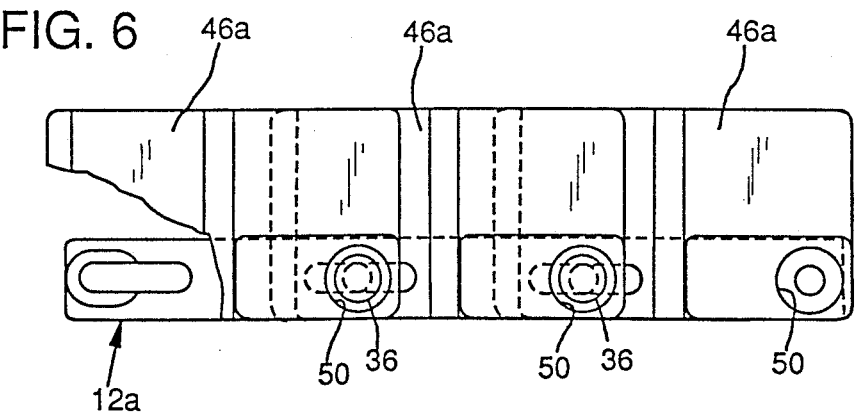

FIGS. 5 and 6 show a further variation which can be used in combination with what is shown in FIGS. 3 and 4. In this embodiment the separate plates 46a are raised, extending substantially higher than the top surface of the belt 12a, to provide barriers at both left and right for retention of product on the belt. In many uses of such belts, products are loaded quite densely on the belt, and there often is low friction between the belt and the bottom of the product. Thus, items can tend to slide off the belt or into the driving cage, on a belt without edge barriers. In the present invention the barriers are integral with the separate end member plates 46a of each belt module, thus enabling the plate to cooperate in providing a higher friction driving surface (as discussed above) while also functioning to hold product on the belt.

I claim:

1. A low tension conveyor belt system with a plastic conveyor belt, comprising, a driving tower or drum on a substantially vertical axis, with a wearstrip belt support platform arranged in a helical path around the driving tower, an endless plastic conveyor belt positioned on a wearstrip belt support and extending tangentially off the wearstrip belt support and away from the driving tower, with means separate from the driving tower for engaging the belt and feeding it in a return path back to the driving tower and onto the wearstrip belt support at an opposite axial end of the driving tower from the position at which the belt exited the driving tower, and said plastic conveyor belt being assembled from a series of plastic belt modules each having end members at its ends, and the adjacent belt modules being interconnected by rods passing through openings in the modules in interdigited projections of the adjacent modules, said end members having substantially smooth surface structure which engages frictionally against the exterior surfaces of the driving tower, said surface structure being substantially uninterrupted along its line of contact with the driving tower surfaces so that the exterior surfaces of the driving tower frictionally drive the conveyor belt along said helical path, whereby the plastic conveyor belt operates smoothly around the driving tower and is efficiently driven, without snagging and without excessive wear of exposed components on the edge of the belt engaged by the driving tower.

2. The plastic conveyor belt system of claim 1, wherein the end members of the belt modules, at least on said one side of the belt, are slightly concavely curved, generally with a curvature conforming to that of the exterior of the driving tower.

3. The plastic conveyor belt system of claim 1, wherein the end members of the belt modules comprise end plates of a different, higher-friction plastic material than that of the remainder of the module.

4. The plastic conveyor belt of claim 3, wherein the end plates are raised, extending substantially above the upper surface of the belt, for providing a barrier to prevent products from sliding off the edge of the belt.

5. The plastic conveyor belt of claim 1, wherein at least one of the end members on each belt module has a recess receiving a head at one end of the rod passing through the module, so that at least on one side of the belt, which engages against the driving tower, rod heads are recessed in said substantially smooth surface.

* * * * *